(12) United States Patent
Satoji et al.

(10) Patent No.: US 7,985,025 B2
(45) Date of Patent: Jul. 26, 2011

(54) HYDRODYNAMIC BEARING DEVICE

(75) Inventors: Fuminori Satoji, Kuwana (JP); Kenji Ito, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 1287 days.

(21) Appl. No.: 10/526,170

(22) PCT Filed: Sep. 9, 2003

(86) PCT No.: PCT/JP03/11531
§ 371 (c)(1),
(2), (4) Date: Feb. 23, 2005

(87) PCT Pub. No.: WO2004/029471
PCT Pub. Date: Apr. 8, 2004

(65) Prior Publication Data
US 2005/0254735 A1 Nov. 17, 2005

(30) Foreign Application Priority Data
Sep. 26, 2002 (JP) .................... 2002-281596

(51) Int. Cl.
*F16C 32/06* (2006.01)
(52) U.S. Cl. ...................................... 384/107; 384/121
(58) Field of Classification Search .................. 384/100, 384/107, 114, 119–121; 310/90; 360/99.07, 360/99.08
See application file for complete search history.

(56) References Cited

U.S. PATENT DOCUMENTS

| | | | | |
|---|---|---|---|---|
| 5,683,183 A | * | 11/1997 | Tanaka et al. | 384/100 |
| 6,133,660 A | * | 10/2000 | Suzuki et al. | 310/90 |
| 6,832,853 B2 | * | 12/2004 | Fujinaka | 384/100 |
| 7,008,112 B2 | * | 3/2006 | Yamashita et al. | 384/119 |
| 2002/0025089 A1 | * | 2/2002 | Mori et al. | 384/100 |
| 2002/0173431 A1 | * | 11/2002 | Hirata | 508/107 |
| 2007/0177831 A1 | * | 8/2007 | Shibahara | 384/107 |

FOREIGN PATENT DOCUMENTS

| JP | 60-11536 | 3/1985 |
|---|---|---|
| JP | U05-84174 | 11/1993 |

(Continued)

OTHER PUBLICATIONS

Japanese Examination Report of Japan Application No. 2005-33434, dated May 21, 2010.

(Continued)

*Primary Examiner* — Justin Krause
(74) *Attorney, Agent, or Firm* — J.C. Patents

(57) ABSTRACT

A bearing sleeve 8 is press-fitted into a housing 7, and an axial portion 2a of an axial member 2 is inserted into the inner peripheral surface 8a of the bearing sleeve 8, and then a thrust member 10 is attached to the lower end of the inner peripheral surface 7c of the housing 7 and positioned in a predetermined position to fix it by ultrasonic welding. The lower end of the housing 7 is pressed against the outer peripheral surface of the thrust member 10 with applying ultrasonic vibration, to fix the melting junction surface of the housing 7 on the thrust member 10.

1 Claim, 5 Drawing Sheets

FOREIGN PATENT DOCUMENTS

| | | |
|---|---|---|
| JP | 06-058327 | 3/1994 |
| JP | U06-70460 | 9/1994 |
| JP | 06-302098 | 10/1994 |
| JP | 07-208457 | 8/1995 |
| JP | 07-264796 | 10/1995 |
| JP | 09-327153 | 12/1997 |
| JP | 10-225052 | 8/1998 |
| JP | 11-285195 | 10/1999 |
| JP | 2000-230554 | 8/2000 |
| JP | 2000-291648 | 10/2000 |
| JP | 2001-268844 | 9/2001 |
| JP | 2002-058198 | 2/2002 |
| JP | 2002-061637 | 2/2002 |
| JP | 2002-061641 | 2/2002 |
| JP | 2002-147444 | 5/2002 |
| WO | WO 02/01060 | 1/2002 |
| WO | WO 02/10602 | 2/2002 |

OTHER PUBLICATIONS

English Translation of Chinese First Examination Report of Chinese Application No. 200810098185.9, dated Jun. 19, 2009.
Chinese First Examination Report of Chinese Application No. 200810098185.9, dated Jun. 19, 2009.

* cited by examiner

HYDRODYNAMIC BEARING DEVICE

TECHNICAL FIELD

The present invention relates to a dynamic bearing device which rotatably supports an axial member in a non-contact manner by the action of dynamic pressure of lubricating oil generated in a bearing gap. This bearing device is ideal for use in information-processing equipment, including the spindle motors for magnetic disk devices such as HDD and FDD, optical disk devices for CD-ROM, CD-R/RW, DVD-ROM/RAM, etc. and magneto-optical disk devices for MD, MO, etc., the polygon scanner motors in laser beam printers (LBP), or as small-scale motors for electrical equipment such as axial flow fans.

BACKGROUND ART

Various types of foregoing motors are required to rotate with high accuracy, at high speed and with low noise, and to be manufactured at low cost. A bearing for supporting a spindle of the motor is one of elements to determine these required performances, so that a dynamic pressure bearing having characteristics superior in the above required performances is considered to be used, or is actually used as this type of bearing, in recent years.

A dynamic bearing device installed in a spindle motor of a disc device such as HDD and the like, for example, is provided with a radial bearing portion for rotatably supporting an axial member in a non-contact manner in a radial direction, and a thrust bearing portion for rotatably supporting the axial member in a non-contact manner in a thrust direction, and the radial bearing portion utilizes grooves for generating dynamic pressure (dynamic pressure generating grooves) formed in the inner peripheral surface of a bearing sleeve, or in the outer peripheral surface of the axial member. The thrust bearing portion utilizes, for example, a dynamic pressure bearing in which dynamic pressure generating grooves are formed in the both end faces of a flange portion of the axial member, or in faces opposed thereto (the end face of the bearing sleeve, the end face of a thrust member fixed in a housing, and the like) (refer to, for example, Japanese Patent Laid-Open Publication No. 2000-291648).

Generally, the bearing sleeve is fixed on a predetermined position of the inner periphery of the housing, and in most cases, a seal member is disposed in an opening of the housing to prevent lubricating oil injected into the internal space of the housing from leaking outside.

In the dynamic bearing device having the above structure which comprises the housing, the bearing sleeve, the axial member, the thrust member, and the seal member, an effort is under way to increase accuracy in finishing each part and in assembling them, for the purpose of ensuring high bearing performance necessary in accordance with highly increase in performance of information-processing equipment. In this type of dynamic bearing device, on the other hand, cost reduction is highly demanded in accordance with the downward trend of the price of the information-processing equipment.

Increase in efficiency of an assembly process is one of key factors in the cost reduction of this type of dynamic bearing device. In other words, the housing and the bearing sleeve, the housing and the thrust member, and the housing and the seal member are secured to each other with adhesive in general, but using adhesive is a cause of decrease in efficiency of the assembly process, because it takes relatively long time for applying and solidifying the adhesive. The possibility of outgas generation due to the adhesive and the deterioration of adhesion with a lapse of time are feared too.

DISCLOSURE OF THE INVENTION

An object of the present invention is to provide a dynamic bearing device which increases the efficiency of an assembly process to reduce manufacturing cost still further.

Another object of the present invention is to provide a dynamic bearing device which decreases the generation of outgas from a fixing portion between parts, and decreases the deterioration of adhesion thereof with a lapse of time.

To achieve the above object, a dynamic bearing device according to the present invention, comprising a housing, a bearing sleeve fixed on an inner periphery of the housing, an axial member having an axial portion and a flange portion, a thrust member attached to one end of the housing, a radial bearing portion provided between the bearing sleeve and the axial portion to support the axial portion in a radial direction in a non-contact manner by an action of dynamic pressure of lubricating oil generated in a radial bearing gap, and a thrust bearing portion provided between the bearing sleeve and the flange portion, and between the thrust member and the flange portion, in order to support the flange portion in a thrust direction in a non-contact manner by an action of dynamic pressure of the lubricating oil generated in a thrust bearing gap, is characterized in that the housing is made of resin.

Since the housing made of resin is formed by molding, such as injection molding and the like, it is possible to manufacture the housing at low cost, as compared with a metal housing machined by lathe turning and the like, and it is also possible to ensure relatively high accuracy, as compared with a metal housing manufactured by press working.

In the above structure, the thrust member may be fixed on one end of the resin housing by welding. Fixing the housing and the thrust member by welding makes it possible to improve operating efficiency, as compared with ordinary fixing by adhesive, and to prevent or restrain the generation of outgas from a fixing portion and the deterioration of adhesion with a lapse of time.

"Welding" used herein refers to a phenomenon in which the junction surface(s) of one or both of two parts to be joined melts/melt to fix. Means for welding such as, for example, ultrasonic welding, vibration welding, high frequency induction heating welding, hot plate welding or the like is properly selected and adopted depending on the material of parts to be welded, a welding condition, and the other various conditions. Generally, in ultrasonic welding, ultrasonic vibration is applied concurrently with welding pressure to melt and weld a junction surface by generating strong frictional heat in a part of resin product. In vibration welding, two parts to be welded are vibrated in a predetermined direction with applying welding pressure, to melt and weld junction surfaces. In high frequency induction heating welding, a high-frequency field is applied to a part to be welded, to melt and weld a junction surface by generating heat by over-current loss. In hot plate welding, a heat source (a hot plate) at high temperature makes contact with a junction surface of a resin product, to melt and weld a junction surface. Of these welding means, ultrasonic welding is the most preferable in view of simple equipment and short welding time.

Instead of the structure described above, the thrust member may be attached to one end of the resin housing, and a seal member may be fixed on the end of the housing by welding.

The welding described above may be adopted to fix the bearing sleeve in the resin housing. In this case, if the bearing sleeve is made of sintered metal, melting resin in the junction surface of the housing gets into internal pores through surface pores (a part formed by internal pores of porous texture of sintered metal opening to the surface) of the junction surface of the bearing sleeve to solidify. Solidified parts inside the internal pores bring the bearing sleeve into intimate contact with the housing due to a kind of anchor effects, so that the bearing sleeve and the housing do not relatively get out of positions, and it is possible to obtain a secured fixation condition.

In a case of providing a seal portion in the other end of the housing, the seal portion is integrally formed in the other end of the housing, or a separate seal member is fixed on the other end of the housing. In the latter case, welding described above may be adopted to fix the seal member on the resin housing.

It is preferable that resin forming the housing is thermoplastic resin, and especially in the housing into which the bearing sleeve is press-fitted, it is further preferable that the linear expansion ration thereof is equal to, or less than, $8.0 \times 10^{-5}$/degrees centigrade. In other words, in the housing into which the bearing sleeve is press-fitted, press-fitting fixation force to endure the product of the weight of the bearing sleeve itself and the standard acceleration in an impact test is necessary. To ensure the press-fitting fixation force necessary in the operating temperature range, 0 to 80 degree centigrade, of this type of dynamic bearing device, it is preferable that the linear expansion ration of resin forming the housing is equal to, or less than, $8.0 \times 10^{-5}$/degrees centigrade. Increase in the press-fitting area of the bearing sleeve in the housing makes it possible to increase the press-fitting fixation force, but when, for example, the thickness of the housing is thin, such as 2 mm or less, the press-fitting area in the resin housing is 100 μm at the maximum, and approximately 50 μm is preferable. If the press-fitting area is larger than that, since accuracy in the external diameter of the housing decreases, there are possibilities that a problem occurs when installing the dynamic bearing device in a spindle motor and the like, and a crack occurs in the housing by excessive press-fitting force. To be more specific, for example, resin having LCP or PES as a main composition can be used as resin to form the housing.

The bearing sleeve may be made of sintered metal, and the housing may be made of the same type of metal as the bearing sleeve, and the bearing sleeve may be fixed on the inner periphery of the housing by welding. "The same type" used herein refers to that a principal composition (base metal) is the same. Taking a case, for example, that the bearing sleeve is made of sintered metal having copper as a main composition, the housing is made of copper base metal, for example, brass. Structure like this makes it possible to tightly fix the bearing sleeve in the housing by ultrasonic welding and the like.

BEST MODE FOR CARRYING OUT THE INVENTION

An embodiment of the present invention will be hereinafter described.

Figure 1:
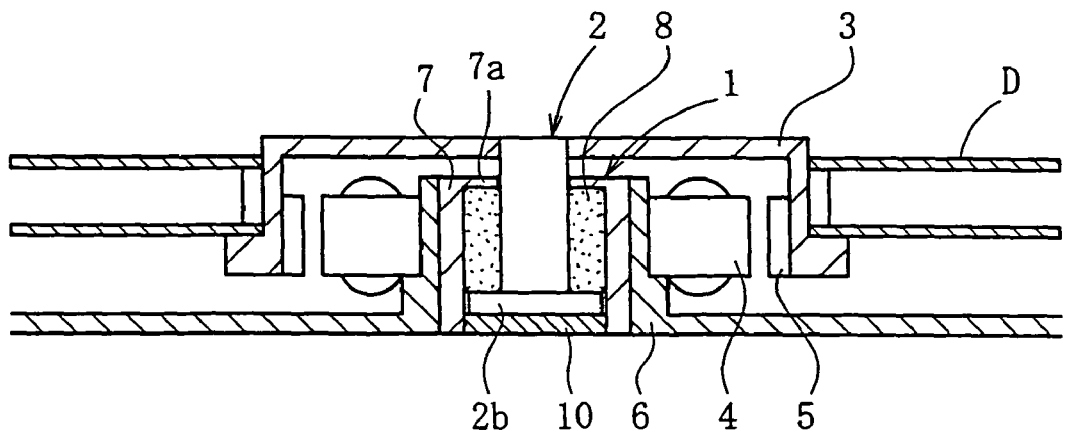
FIG. 1 is a sectional view of a spindle motor for information-processing equipment which uses a dynamic bearing device according to the present invention.

FIG. 1 shows one example of a spindle motor for information-processing equipment in which a dynamic bearing device 1 according to this embodiment is installed. The spindle motor, used as a disc drive device such as HDD and the like, comprises a dynamic bearing device 1 for rotatably supporting an axial member 2 in a non-contact manner, a disc hub 3 secured to the axial member 2, and a motor stator 4 and a motor rotor 5 which are opposed to each other across, for example, a gap in a radial direction. The stator 4 is attached to the outer periphery of a casing 6, and the rotor 5 is attached to the inner periphery of the disc hub 3. A housing 7 of the dynamic bearing device 1 is fitted into the inner periphery of the casing 6. The disc hub 3 holds one or a plurality discs D such as a magnetic disc and the like. Upon energizing the stator 4, the rotor 5 starts rotating by the electromagnetic force occurring between the stator 4 and the rotor 5, so that the disc hub 3 and the axial member 2 integrally rotate.

Figure 2:
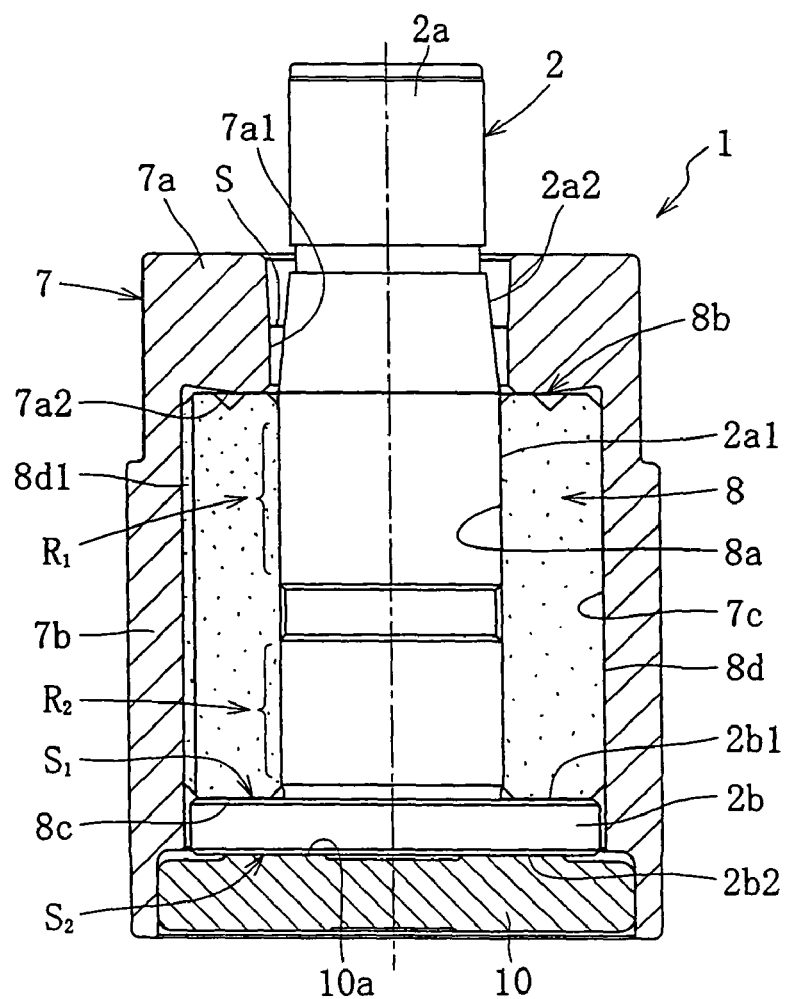
FIG. 2 is a sectional view showing an embodiment of the dynamic bearing device according to the present invention.

FIG. 2 shows the dynamic bearing device 1. This dynamic bearing device 1 comprises the housing 7, the bearing sleeve 8 and the thrust member 10 secured to the housing 7, and the axial member 2.

A first radial bearing portion R1 and a second radial bearing portion R2 are provided separately in the radial direction between the inner peripheral surface 8a of the bearing sleeve 8 and the outer peripheral surface 2a1 of the axial portion 2a of the axial member 2. A first thrust bearing portion S1 is provided between the lower end face 8c of the bearing sleeve 8 and the upper end face 2b1 of a flange portion 2b of the axial member 2, and a second thrust bearing portion S2 is provided between the end face 10a of the thrust member 10 and the lower end face 2b2 of the flange portion 2b. For convenience in explaining, the side of the thrust member 10 is defined as a lower side, and the side opposite to the thrust member 10 is defined as an upper side in the following description.

The housing 7 made of, for example, thermoplastic resin by injection molding has a cylindrical side portion 7b, and a ring-shaped seal portion 7a integrally extending from the upper end of the side portion 7b in an inner radial direction. The inner peripheral surface 7a1 of the seal portion 7a is opposed to a tapered surface 2a2 formed in the outer periphery of the axial portion 2a across predetermined seal space S. The tapered surface 2a2 of the axial portion 2a, the diameter of which gradually decreases as going upward (toward the outside of the housing 7), also functions as a centrifugal seal by the rotation of the axial member 2.

The axial member 2, made of, for example, metal such as stainless steel and the like, has the axial portion 2a and the flange portion 2b provided in the lower end of the axial portion 2a integrally or separately.

The bearing sleeve 8, formed in a cylindrical shape by, for example, porous material made of sintered metal, especially porous material made of sintered metal composed of copper as a main component, is secured to a predetermined position on the inner peripheral surface 7c of the housing 7.

Figure 3A:
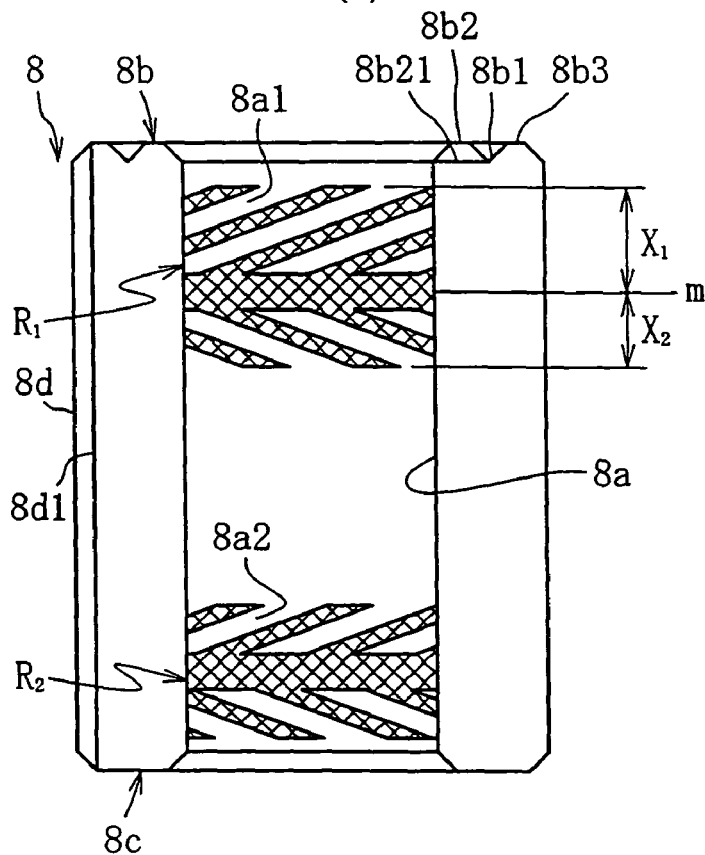
FIG. 3 is a sectional view of the bearing sleeve {FIG. 3(a)}, a bottom plan view thereof {FIG. 3(b)}, and a top plan view thereof {FIG. 3(C)}.

In the inner peripheral surface 8a of the bearing sleeve 8 made of the sintered metal, two of upper and lower areas are provided separately in an axial direction as radial bearing surfaces of the first and second radial bearing portions R1 and R2, and dynamic pressure generating grooves 8a1 and 8a2 in the shape of, for example, herringbone, as shown in FIG. 3(a), are formed in the two areas, respectively. The upper dynamic pressure generating groove 8a1 is asymmetric with respect to the axial center m (the center of the area between upper and lower inclined grooves in the axial direction), and the axial length X1 of an upper area to the axial center m is longer than the axial length X2 of a lower area. In the outer peripheral surface 8d of the bearing sleeve 8, one or a plurality of axial grooves 8d1 are formed throughout its length in the axial direction. In this embodiment, three axial grooves 8d1 are formed at regular intervals along a circumference.

Figure 3B:
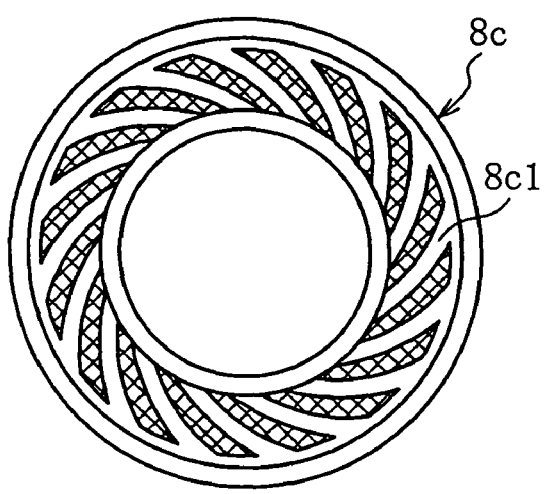

A dynamic pressure generating groove 8c1 in the shape of, for example, a spiral, as shown in FIG. 3(b), is formed in the lower end face 8c of the bearing sleeve 8, as a thrust bearing surface of the first thrust bearing portion S1. The dynamic pressure generating groove may be formed in the shape of herringbone, or in a radial groove shape.

Figure 3C:
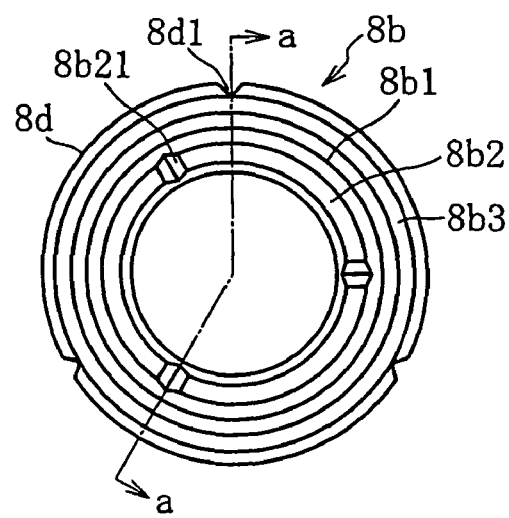

Referring to FIG. 3(c), the upper end face 8b of the bearing sleeve 8 is partitioned into an internal diameter area 8b2 and an external diameter area 8b3 by a circumference groove 8b1 provided in the approximately middle in the radial direction, and one or a plurality of radial grooves 8b21 are formed in the internal diameter area 8b2. In this embodiment, the three radial grooves 8b21 are formed at regular intervals along a circumference.

Figure 4:
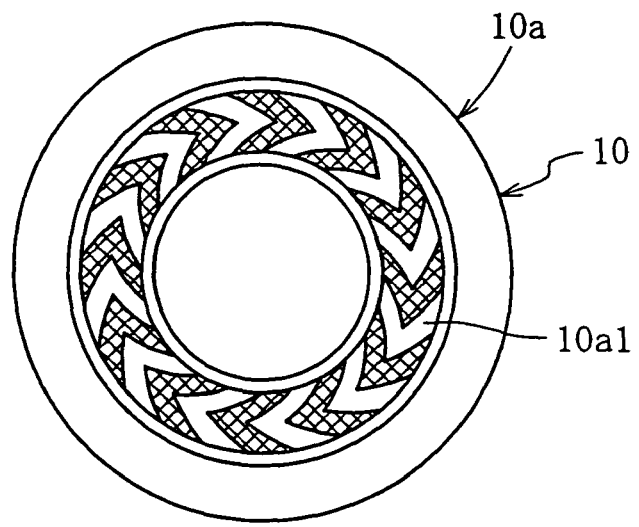
FIG. 4 is a plan view showing an end face of a thrust member.

The thrust member 10 made of, for example, metal such as brass and the like is secured to the lower end of the inner peripheral surface 7c of the housing 7. In the end face 10a of the thrust member 10, serving as a thrust bearing surface of the second thrust bearing portion S2, as shown in FIG. 4, dynamic pressure generating grooves 10a1 in the shape of, for example, herringbone are formed. The dynamic pressure generating groove may be formed in a spiral shape or a radial groove shape.

The dynamic bearing device 1 according to this embodiment is assembled in the following processes, for instance.

First, the bearing sleeve 8 is press-fitted into the inner peripheral surface 7c of the housing 7, and the upper end face 8b thereof abuts on the inner face 7a2 of the seal portion 7a. Thus, the bearing sleeve 8 is fixed in a right position with respect to the housing 7.

The inner face 7a2 of the seal portion 7a is so inclined or bent that the external diameter area thereof is away from the upper end face 8b of the bearing sleeve 8. Thus, the inner face 7a2 of the seal portion 7a is partly in contact with the internal diameter area 8b2 of the upper end face 8b of the bearing sleeve 8, and a gap is formed between the inner face 7a2 and the external diameter area 8b3 of the upper end face 8b.

Then, the axial member 2 is attached to the bearing sleeve 8. To accurately adjust the radial bearing gap, the internal diameter of the bearing sleeve 8 is measured under a condition that the bearing sleeve 8 is press-fitted into the housing 7, to carry out dimension matching with the external diameter of the axial portion 2a (pre-measured). If the inner peripheral surface 7c of the housing 7 is formed in a polygonal shape (for example, a polygon with twenty sides) or an irregular shape in cross section to partly make contact with the outer peripheral surface 8d of the bearing sleeve 8, the deformation in the inner peripheral surface 8a is restrained when press-fitting the bearing sleeve 8, so that it is possible to secure the accuracy of the radial bearing gap.

Then, the thrust member 10 is attached to the lower end of the inner peripheral surface 7c of the housing 7, and adjusted in a right position to be fixed by, for example, ultrasonic welding. While the lower end of the housing 7 is pressed against the outer peripheral surface of the thrust member 10, applied ultrasonic vibration melts the junction face of the housing 7, in order to secure the housing 7 to the thrust member 10. At that time, projections and depressions which are formed in the shape of a knurl, a screw and the like, in the outer peripheral surface of the thrust member 10 are effective at securely fixing the housing 7 on the thrust member 10 by welding.

In completing assembly as described above, the axial portion 2a of the axial member 2 is inserted into the inner peripheral surface 8a of the bearing sleeve 8, and the flange portion 2b is contained in the space between the lower end face 8c of the bearing sleeve 8 and the end face 10a of the thrust member 10. Then, the internal space of the housing 7 sealed with the seal portion 7a, including internal pores of the bearing sleeve 8, is filled with lubricating oil. The oil level of the lubricating oil is maintained within the range of the seal space S.

As means for fixing the bearing sleeve 8 in the housing 7, welding, for example, ultrasonic welding may be adopted instead of the press-fitting described above. At that time, in order to prevent melting resin in the junction face of the housing 7 from flowing to the seal portion 7a, it is preferable that (one or a plurality of) axial groove(s) the volume of which is almost the same as that of the above melting resin is provided, for example, in the inner peripheral surface 7c of the housing 7.

When the axial member 2 rotates, each of the areas (two of upper and lower areas) as the radial bearing surfaces of the inner peripheral surface 8a of the bearing sleeve 8 is opposed to the outer peripheral surface 2a1 of the bearing 2a across the radial bearing gap. The lower end face 8c of the bearing sleeve 8 as the thrust bearing surface is opposed to the upper end face 2b1 of the flange portion 2b across the thrust bearing gap, and the end face 10a of the thrust member 10 as the thrust bearing surface is opposed to the lower end face 2b2 of the flange portion 2b across the thrust bearing gap. The rotation of the bearing member 2 generates the dynamic pressure of the lubricating oil in the above radial bearing gap, and the oil film of the lubricating oil formed in the above radial bearing gap rotatably supports the axial portion 2a of the axial member 2 in the radial direction in a non-contact manner. The first radial bearing portion R1 and the second radial bearing portion R2, which rotatably support the axial member 2 in the radial direction in a non-contact manner, are structured like this. At the same time, the dynamic pressure of the lubricating oil is generated in the above thrust bearing gap, and the oil film of the lubricating oil formed in the above thrust bearing gap rotatably supports the flange portion 2b of the axial member 2 in both thrust directions in a non-contact manner. Thus, the first thrust bearing portion S1 and the second thrust bearing portion S2, which rotatably support the axial member 2 in the thrust directions in a non-contact manner, are structured.

As described above, the dynamic pressure generating grooves 8a1 of the first radial bearing portion R1 are asymmetric with respect to the axial center m, and the axial length X1 of the upper area to the axial center m is longer than the axial length X2 of the lower area {FIG. 3(a)}. Therefore, when the axial member 2 rotates, the retractive force (pumping force) of the lubricating oil due to the dynamic pressure generating grooves 8a1 becomes relatively large in the upper area as compared with in the lower area. The difference in the retractive force flows the lubricating oil, filling the gap between the inner peripheral surface 8a of the bearing sleeve 8 and the outer peripheral surface 2a1 of the axial portion 2a, downward, and the lubricating oil is returned to the radial bearing gap of the first radial bearing portion R1, by circulating through the thrust bearing gap of the first thrust bearing portion S1, the axial groove 8d1, the gap between the inner face 7a2 of the seal member 2a and the external diameter area 8b3 of the upper end face 8b of the bearing sleeve 8, the circumference groove 8b1 of the upper end face 8b of the bearing sleeve 8, and the radial groove 8b21 of the upper end face 8b of the bearing sleeve 8. Since the lubricating oil circulates the internal space of the housing 7, as described above, the pressure of the lubricating oil is prevented from becoming partly negative in the internal space, so that it is possible to solve problems such as the generation of air bubbles due to negative pressure, the leak of the lubricating oil and the occurrence of vibration caused by the generation of air bubbles, and the like. Even if air bubbles get into the lubricating oil for some reason, the air bubbles are discharged to the outside via the oil interface (gas-liquid interface) of the lubricating oil inside the seal space S while the air bubbles circulate with the lubricating oil, so that adverse effects due to the air bubbles are prevented further effectively.

Figure 5:
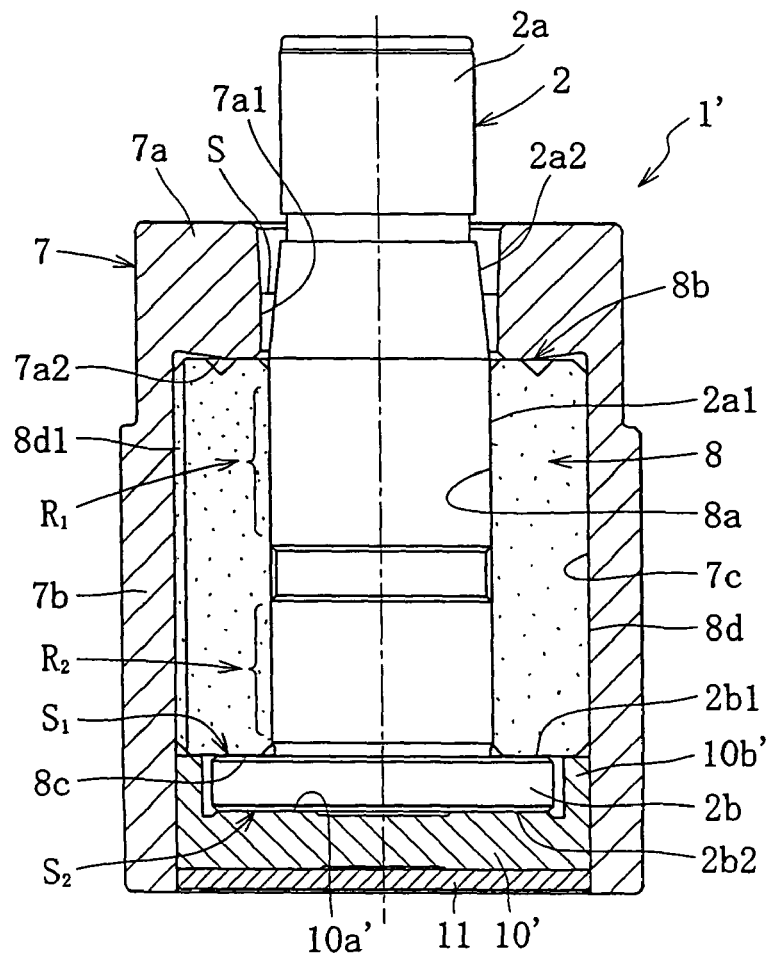
FIG. 5 is a sectional view of another embodiment of the present invention.

FIG. 5 shows a dynamic bearing device 1' according to another embodiment. The substantial difference between the dynamic bearing device 1' and the dynamic bearing device 1 shown in FIG. 2 is that after a thrust member 10' is attached to the lower end of the inner peripheral surface 7c of the housing 7, the seal member 11 is fixed by welding on the lower end.

The thrust member 10' is made of, for example, metal such as brass and the like, and dynamic pressure generating grooves in the shape of, for example, herringbone are formed in the end face 10a' as a thrust bearing surface of the second thrust bearing portion S2. The thrust member 10' is integrally provided with a ring-shaped contact portion 10b' which extends upward from the outer edge of the end face 10a'. The upper end face of the contact portion 10b' makes contact with the lower end face 8c of the bearing sleeve 8, and the inner peripheral surface of the contact portion 10b' is opposed to the outer peripheral surface of the flange portion 2b across a gap.

Figure 6:
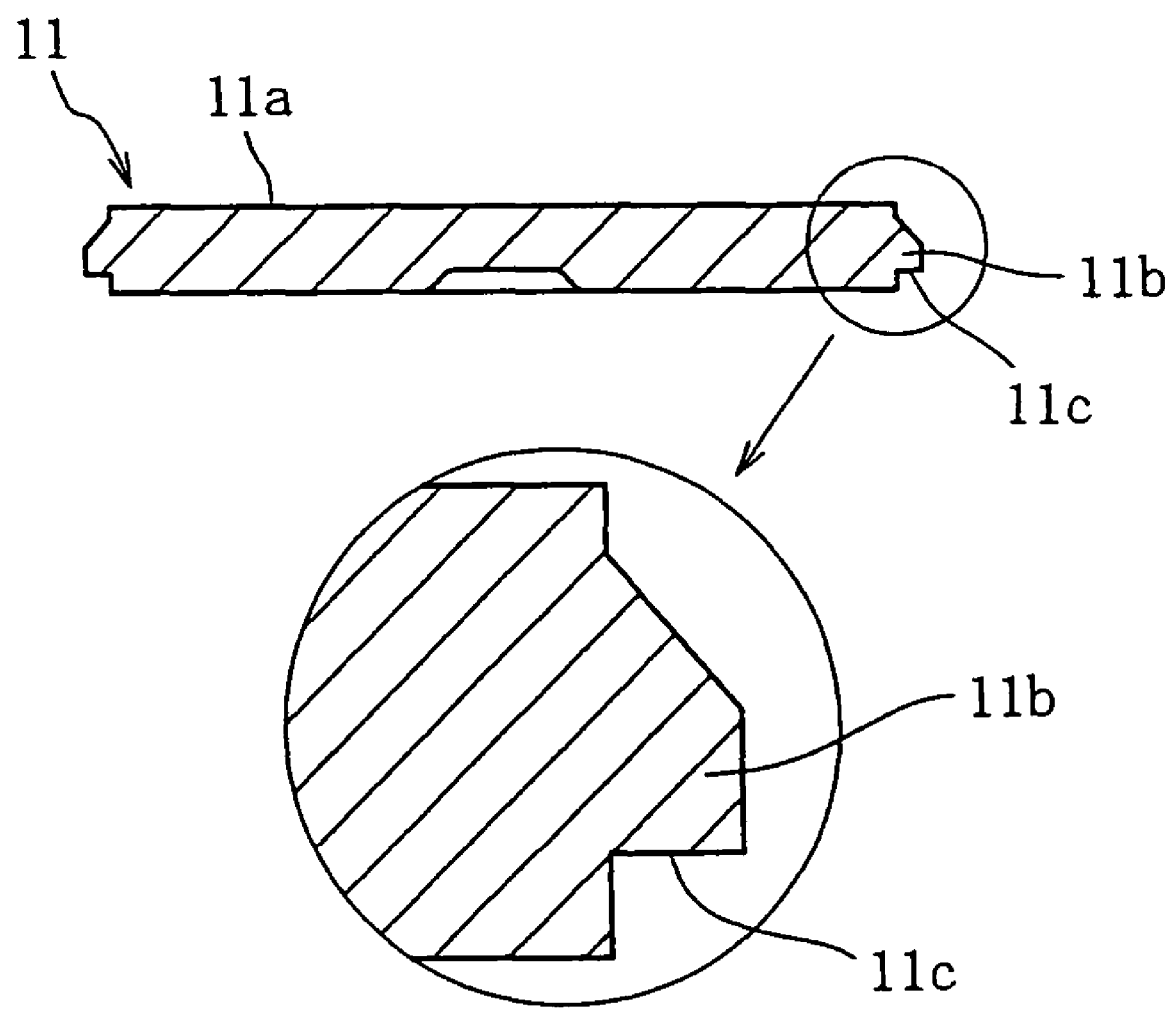
FIG. 6 is a sectional view of a seal member.

The seal member 11, which is made of, for example, resin, is preferably formed in the shape shown in FIG. 6. The seal member 11 shown in FIG. 6 is provided with a welding rib 11b (a portion the thickness of which is narrower than the whole thickness) in the outer peripheral surface, and a recess-shaped resin reservoir 11c in the lower edge of the outer peripheral surface. The upper face 11a of the seal member 11 makes contact with the lower face of the thrust member 10'.

After the bearing sleeve 8 and the axial member 2 are fitted into the housing 7 as described above, the thrust member 10' is inserted into the lower end of the inner peripheral surface 7c of the housing 7, and the upper end face of the contact portion 10b' thereof comes into contact with the lower end face 8c of the bearing sleeve 8. Therefore, the position of the thrust member 10' in the axial direction is determined with respect to the bearing sleeve 8. Controlling the size of the contact portion 10b' and the flange portion 2b in the axial direction makes it possible to accurately determine the thrust bearing gaps of the first thrust bearing portion S1 and the second thrust bearing gap S2. Then, the seal member 11 is attached to the lower end of the inner peripheral surface 7c, and the upper face 11a thereof makes contact with the lower face of the thrust member 10', and the lower end of the housing 7 is pressed against the welding rib 11b of the seal member 11 with applying the ultrasonic vibration (ultrasonic welding), to fix the melting welding rib 11b on the junction face of the housing 7 (depending on a welding condition, the junction face of the housing 7 can melt too.). In welding, the resin fluidized due to the melting of the welding rib 11b can flow into the resin reservoir 11c, so that resin burrs hardly occur after welding.

Figure 7:
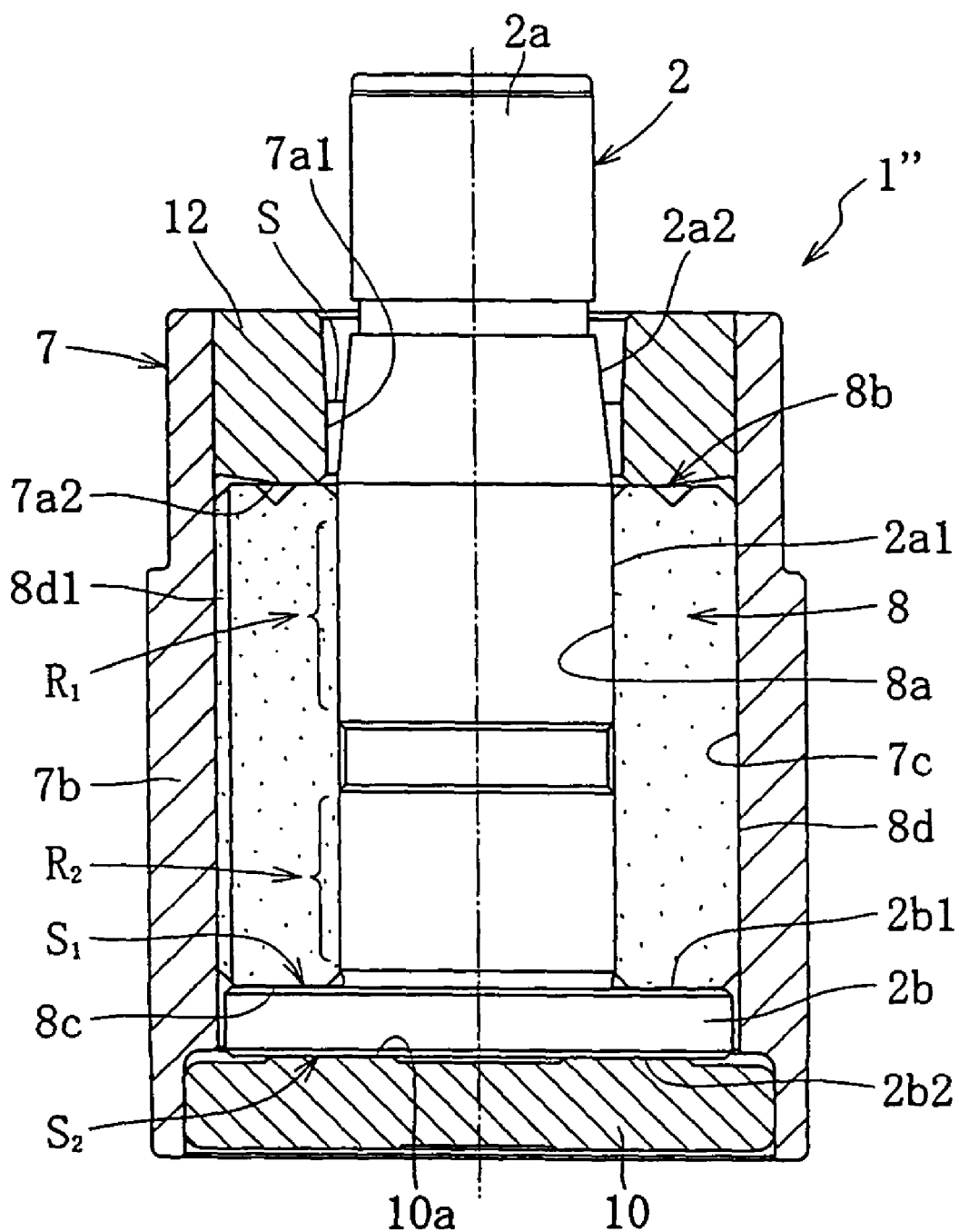
FIG. 7 is a sectional view of further another embodiment of the present invention.

FIG. 7 shows a dynamic bearing device 1" according to further another embodiment. The substantial difference between the dynamic bearing device 1" and the dynamic bearing device 1 shown in FIG. 2 is that the seal portion, composed of a separate seal member 12, is fixed on the upper end of the inner peripheral surface 7c of the housing 7 by welding. The seal member 12, which is made of, for example, resin, is welded to the junction face of the housing 7 by ultrasonic welding. The inner peripheral surface 12a of the seal member 12 is opposed to the tapered surface 2a2 provided in the outer periphery of the axial portion 2a across the predetermined seal space S.

In the above embodiments, the housing 7 is made of resin, but the housing 7 may be made of the same type of metal as the bearing sleeve 8, for example, brass, and the housing 7 and the bearing sleeve 8 may be fixed into one body by welding, for example, ultrasonic welding.

According to the present invention, as described above, the assembly process is made efficient, so that it is possible to provide a dynamic bearing device at further low cost which decreases the generation of outgas from a fixing portion between parts, and decreases the deterioration of adhesion with a lapse of time.

The invention claimed is:

1. A dynamic bearing device comprising:
   a housing;
   a bearing sleeve fixed on an inner periphery of said housing;
   an axial member having an axial portion and a flange portion;
   a thrust member attached to one end of said housing;
   a radial bearing portion provided between said bearing sleeve and said axial portion to support said axial portion in a radial direction in a non-contact manner by an action of dynamic pressure of lubricating oil generated in a radial bearing gap; and
   a thrust bearing portion provided between said bearing sleeve and said flange portion, and between said thrust member and said flange portion, to support said flange portion in a thrust direction in a non-contact manner by an action of dynamic pressure of said lubricating oil generated in a thrust bearing gap,
   wherein said thrust member comprises an end face which has a thrust bearing surface of said thrust bearing portion, and an annular contact portion which extends axially toward the other end of said housing from said end face, and said bearing sleeve comprises an end face which has a thrust bearing surface of said thrust bearing portion, and
   wherein an inner peripheral surface of said annular contact portion of said thrust member is oppose to an outer peripheral surface of said flange portion across a gap, and an end face of said annular contact portion makes contact with said end face of said bearing sleeve.

* * * * *